US009463779B2

(12) United States Patent
Gross et al.

(10) Patent No.: US 9,463,779 B2
(45) Date of Patent: Oct. 11, 2016

(54) WIPER ASSEMBLY FOR SWEEPING A GLASS SURFACE ON A VEHICLE

(76) Inventors: Kenneth A. Gross, Northridge, CA (US); Robert V. Rhodes, South Pasadena, CA (US); Michael A. Gross, La Canada, CA (US)

(*) Notice: Subject to any disclaimer, the term of this patent is extended or adjusted under 35 U.S.C. 154(b) by 1601 days.

(21) Appl. No.: 12/584,014

(22) Filed: Aug. 28, 2009

(65) Prior Publication Data

US 2011/0047738 A1  Mar. 3, 2011

(51) Int. Cl.
  *B60S 1/52*    (2006.01)
  *B60S 1/46*    (2006.01)
  *B60S 1/38*    (2006.01)

(52) U.S. Cl.
  CPC .............. *B60S 1/524* (2013.01); *B60S 1/3801* (2013.01); *B60S 1/3886* (2013.01); *B60S 2001/3824* (2013.01); *B60S 2001/3836* (2013.01)

(58) Field of Classification Search
  CPC .......... B60S 1/52; B60S 1/524; B60S 1/482; B60S 1/546; B60S 2001/3824; B60S 2001/3836
  USPC ............ 15/250.48, 250.01–250.04, 250.361; 239/284.1
  See application file for complete search history.

(56) References Cited

U.S. PATENT DOCUMENTS

| | | | |
|---|---|---|---|
| 3,793,670 A | | 2/1974 | Riester et al. |
| 3,881,212 A | * | 5/1975 | Regler .................. 15/250.04 |
| 4,516,288 A | | 5/1985 | Fizyta et al. |
| 4,517,704 A | | 5/1985 | Benson |
| 5,383,247 A | * | 1/1995 | Nickel .................. 15/250.04 |
| 5,426,814 A | | 6/1995 | Minnick |

FOREIGN PATENT DOCUMENTS

| | | | |
|---|---|---|---|
| DE | 2028507 | * | 12/1971 |
| DE | 2133270 | * | 1/1973 |
| DE | 3315043 | * | 10/1984 |
| DE | 3337815 | * | 3/1985 |
| DE | 10058455 | * | 6/2002 |
| FR | 2695606 | * | 3/1994 |
| GB | 2093339 A | * | 9/1982 |

* cited by examiner

*Primary Examiner* — Gary Graham

(74) *Attorney, Agent, or Firm* — Risso & Associates

(57) ABSTRACT

A wiper assembly for sweeping a glass surface on a vehicle. The wiper assembly includes a windshield washer assembly connected to the windshield wiper drive arm of the vehicle for controllably dispensing washer fluid onto the glass surface of the vehicle. The wiper assembly includes a pivotally mounted wiper blade and a washer liquid feed conduit carried by the body of the wiper blade that is connected to the fluid reservoir of the vehicle for supplying a washing liquid directly upon the glass surface of the vehicle via the wiper assembly. Uniquely, the flow of fluid onto the glass surface of the vehicle is determined by the position of the wiper blade relative to the glass surface. Advantageously, the washer liquid feed conduit and blade assembly can be interconnected with the supporting structure of the windshield wiper assembly without the need for special tools and without the need for any substantial modification to the conventional wiper assembly.

17 Claims, 7 Drawing Sheets

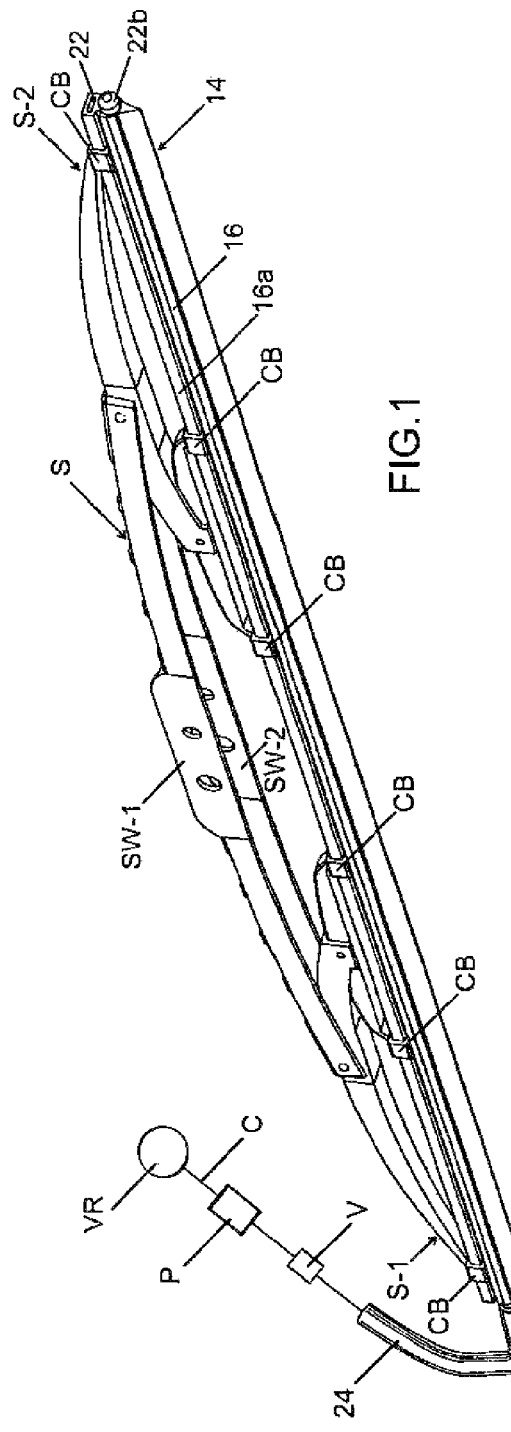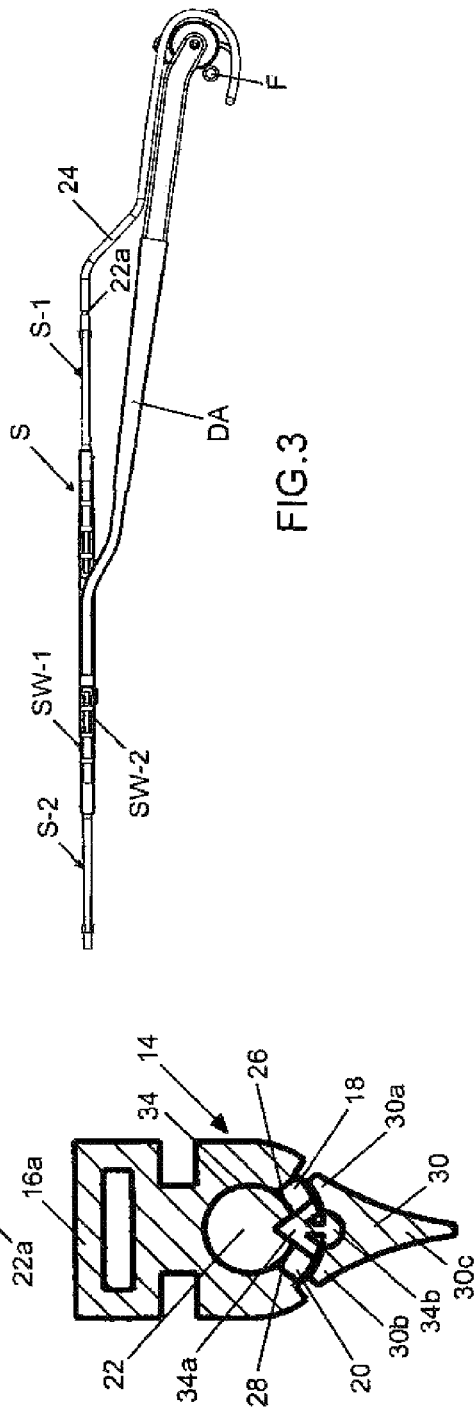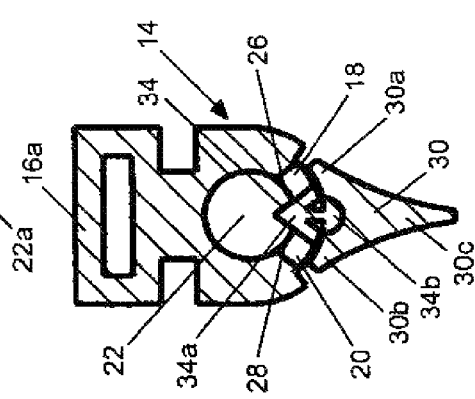

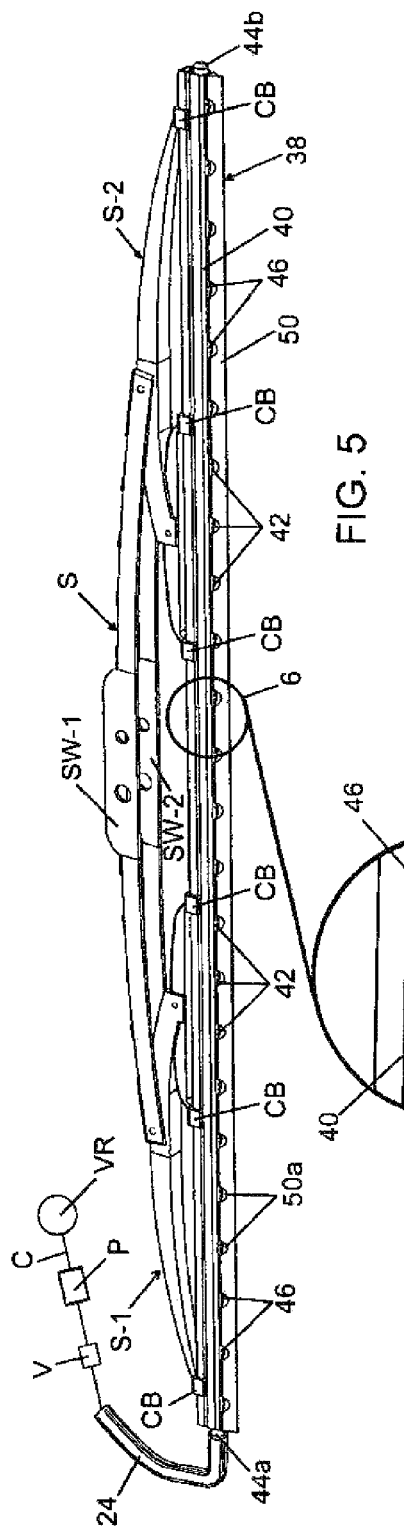
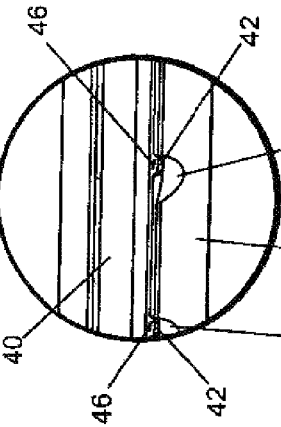
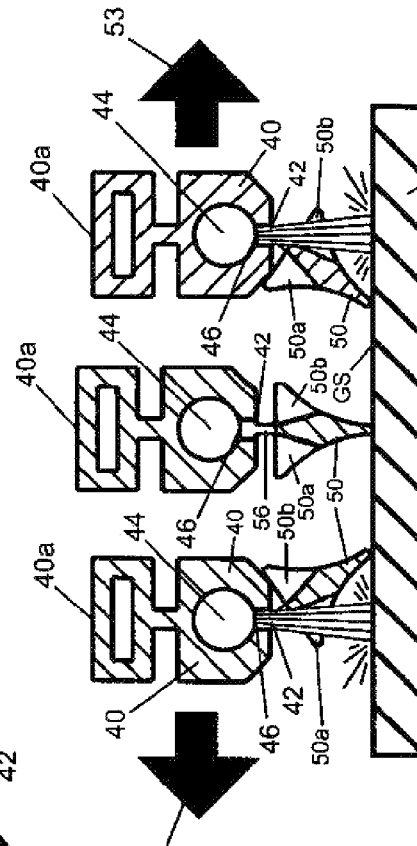
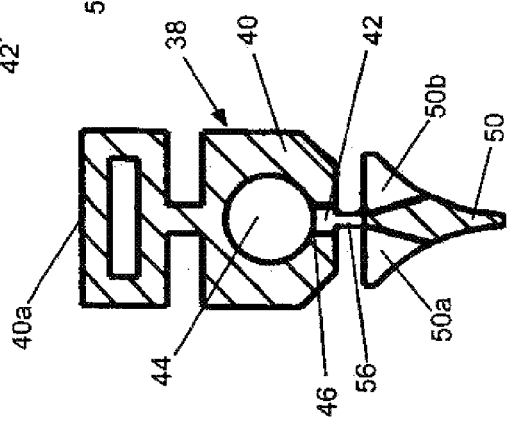

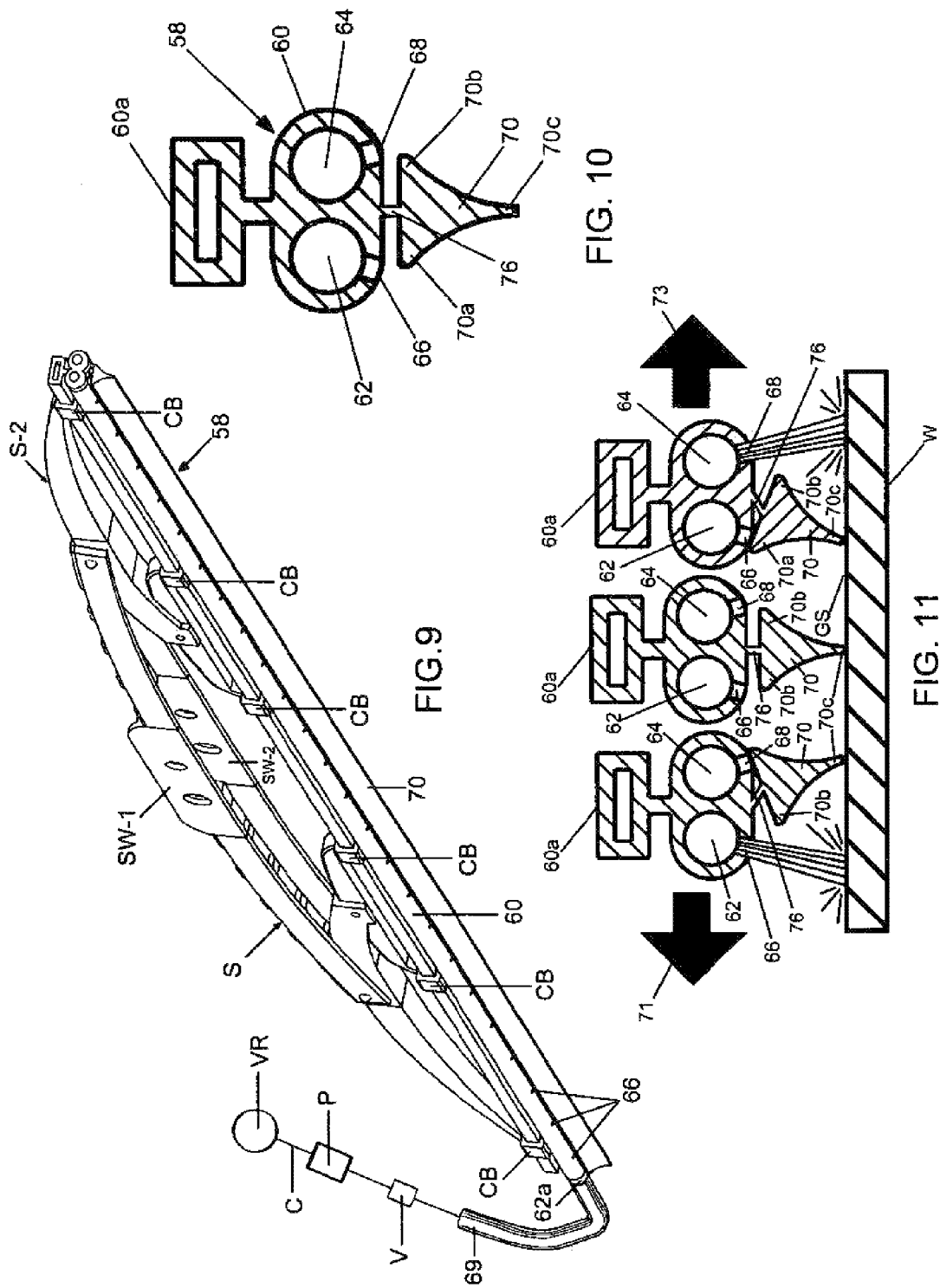

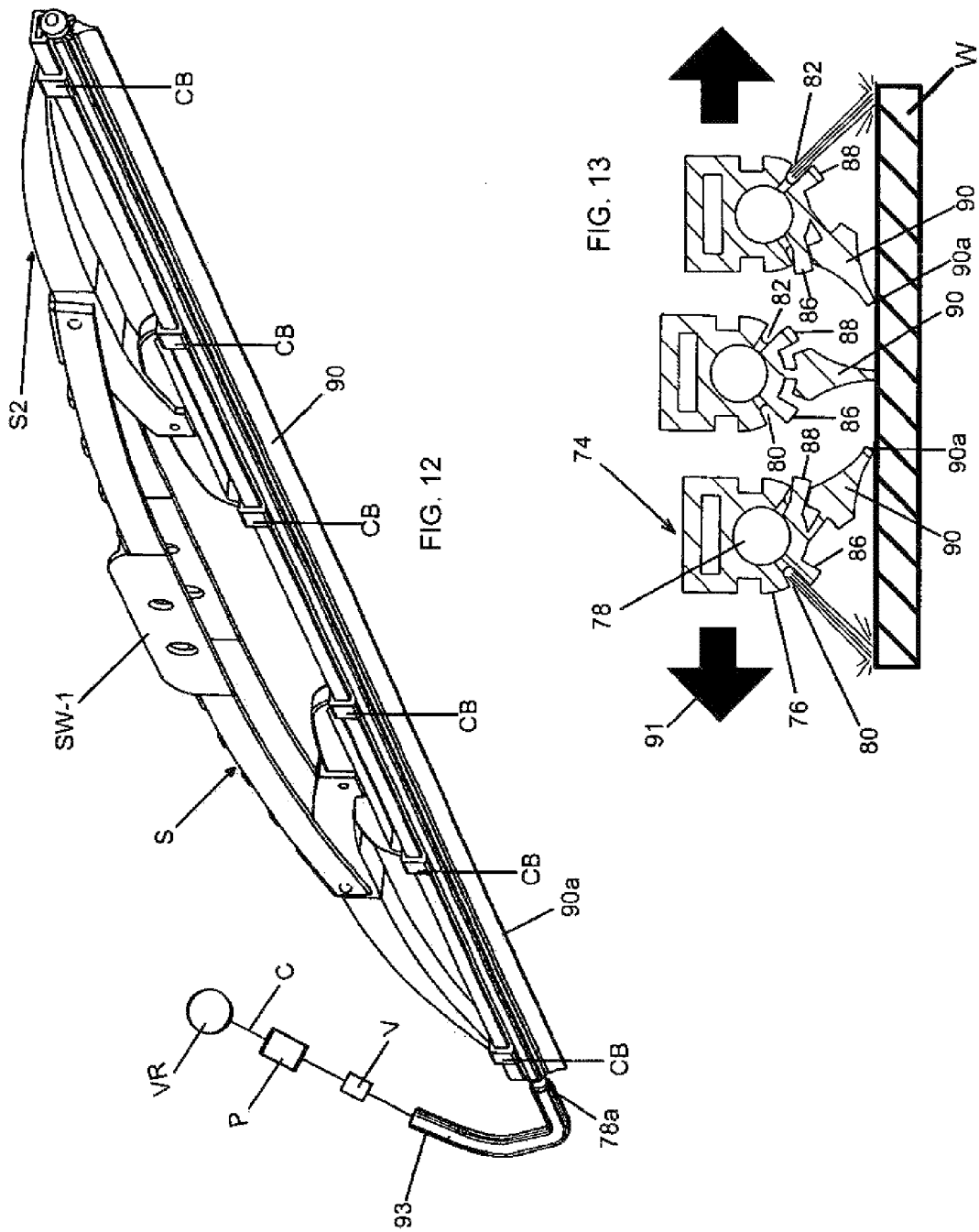

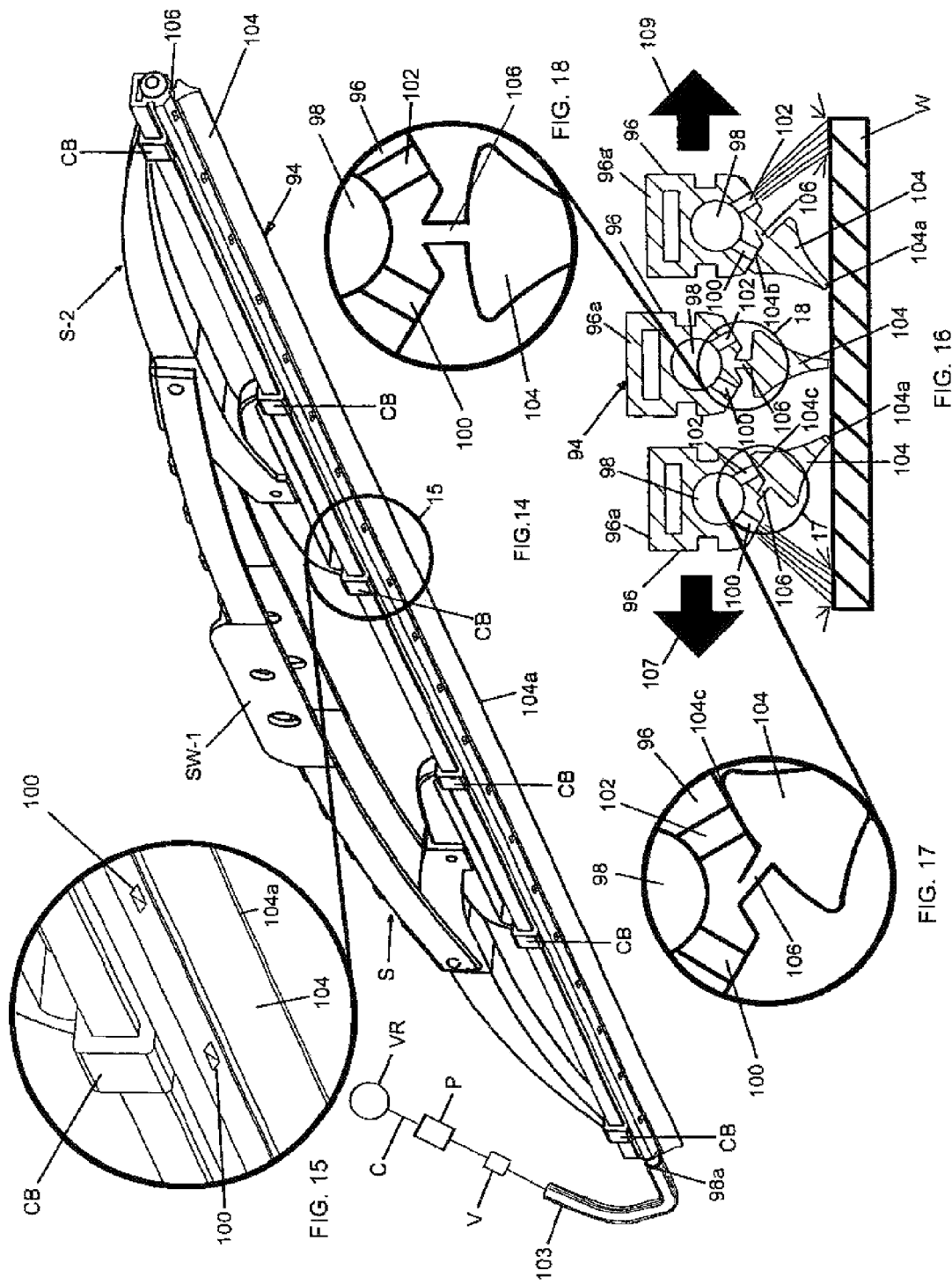

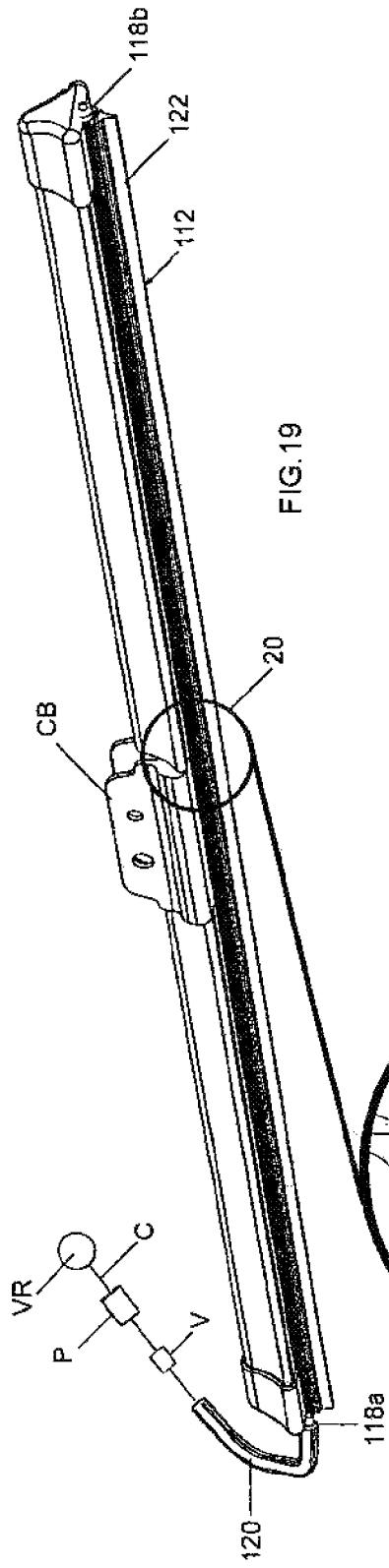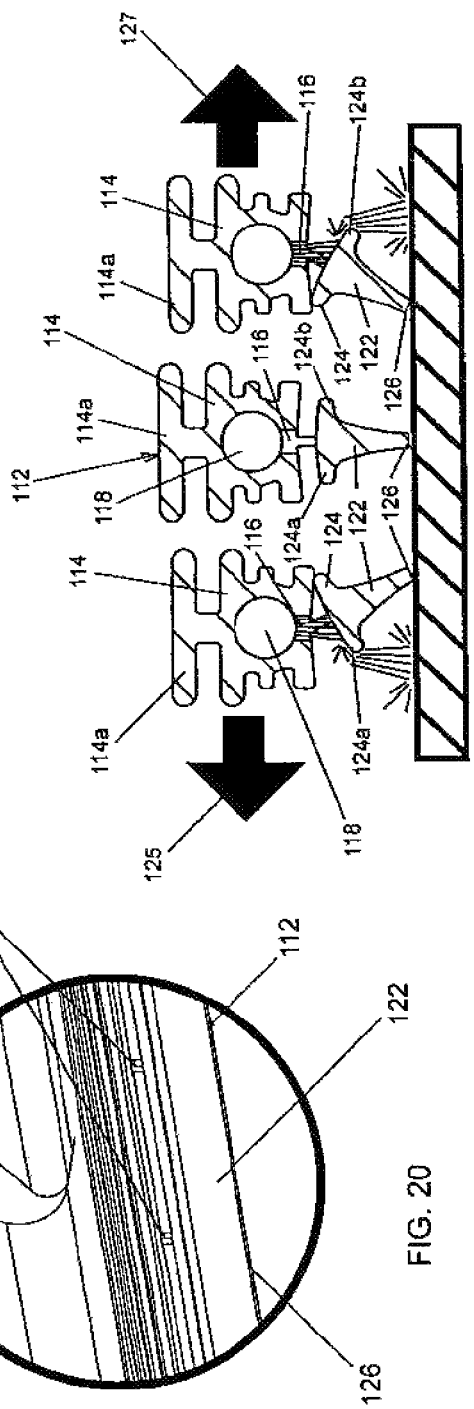

WIPER ASSEMBLY FOR SWEEPING A GLASS SURFACE ON A VEHICLE

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

The present invention relates generally to wiper assemblies for sweeping a glass surface on a vehicle. More particularly, the invention concerns a wiper assembly that includes a feed conduit connected to a fluid pump and liquid reservoir of a vehicle. Uniquely, the position of the wiper blade of the wiper assembly controls the flow of washing liquid to the glass surface of the vehicle.

2. Description of Related Art Including Information Disclosed Under 37 CFR 1.97 and 1.98

Most modern motor vehicles provide a wiper assembly for wiping the windshield of the vehicle and some type of washing system for washing the windshield of the vehicle. As a general rule, a washing liquid reservoir is provided in the engine compartment of the vehicle along with a pump which pumps the washing liquid from the reservoir toward hood-mounted washer heads that deliver the washing liquid to the windshield at a location about the windshield wiper.

A common drawback of the vehicle systems which include two hood-mounted washer heads is that during the windshield washing process the cleaning fluid is delivered to the windshield either at a location above the wiper blade, which is typically partly through its upward cycle, or alternatively at a point below the wiper blade when the wiper blade is partly through its downward path. This arrangement results in the washing fluid being spread in a solid fan dispersement, temporarily impairing the driver's vision while also allowing the upward path of the wiper blade to smear the residue on the glass, further impairing the view of the driver. Because of this drawback the vehicle operator is required to repeatedly supply washing fluid to the windshield in order to adequately clean the windshield and thus repeatedly impairing the vision of the driver.

A number of prior art patents disclose various types of windshield washer apparatus that can be removably attached to a conventional wiper blade. Exemplary of such an apparatus is that disclosed in U.S. Pat. No. 4,517,704 issued to Benson. This apparatus includes an elongated member defining a generally U-shaped cross section and including adjacent one side thereof a tubular portion extending the longitudinal extent of the elongated member, the tubular portion defining a plurality of apertures therein. The elongated member further includes adjacent an opposite side thereof, a U-shaped channel portion extending longitudinally of the elongated member. An elongated hollow tubing removably retained by the U-shaped channel portion is interconnected at one end to an open end of the tubular portion and at the other end to a conduit from a cleaning solution source.

Another prior art windshield washer apparatus is disclosed in U.S. Pat. No. 4,516,288 issued to Benson. This apparatus includes apparatus that is disclosed in U.S. Pat. No. 4,517,704 issued to Fizyta. This apparatus includes a spray nozzle mounted on the wiper arm intermediate the ends of the wiper blade. The nozzle includes a first baffle surface disposed at an obtuse angle relative to a base surface and at an acute angle relative to a transverse frontal wall surface upstanding from the base surface. A fluid dispensing orifice extends through the transverse wall with its axis normal to the frontal wall surface. Secondary baffle surfaces are provided by means of a notched-out portion formed in the first baffle surface. The orifice directs a stream of fluid such that a primary spray of the fluid is dispersed to upper and intermediate bladed areas of the windshield and a secondary spray of fluid is dispersed normal to the lower bladed area of the windshield.

Still another prior art windshield washer apparatus is disclosed in U.S. Pat. No. 3,793,670 issued to Riester, et al. This apparatus includes an arm mounted spray nozzle. The nozzle includes a baffle projecting from a base member having a surface at a compound angle with respect to the member for dispersing the fluid into a conical-shaped configuration of droplets and directing the array of droplets toward the windshield in the path of the windshield wiper. Washer solvent under pressure is directed through an orifice toward the baffle. A nipple is provided at the orifice to which flexible tubing extending along the length of the arm is connected at one end. At the other end the tubing is connected to a washer pump so that washer fluid can be directed through the tubing and the orifice against the baffle.

As a general rule, the prior art vehicle windshield washing systems fail to effectively and efficiently clean the vehicle windshield without undesirable smearing and in use tend to be only slightly better than conventional hood-mounted washer heads typically found on most modern vehicles.

The thrust of the present invention is to overcome the drawbacks of the prior art vehicle windshield washing systems by providing a novel vehicle wiper assembly that includes not only a liquid feed conduit carried directly by the vehicle wiper system, but also uniquely includes a novel wiper blade assembly that precisely regulates the flow of fluid onto the windshield. More particularly, the wiper blade assembly includes a pivotally mounted wiper blade that controls the flow of washing fluid onto the vehicle windshield based upon the position of the wiper blade. The elongated washing liquid feed conduit, carried by the body of the wiper blade which extends from the blade assembly, is interconnected with the vehicle washing fluid reservoir by an elongated flexible tube which can readily be connected to the washing liquid pump that is typically housed within the vehicle engine compartment.

With this novel arrangement, the wiper assembly of the present invention can be used to readily replace the original wiper assembly supplied with the vehicle and can be easily interconnected with the washing liquid reservoir by simply removing the flexible tube used to connect the liquid pump with the hood-mounted spray head and replacing it with the flexible tube and combined washer tube and blade assembly unit that is interconnected with the liquid feed conduit of the vehicle. This replacement can be accomplished quickly and easily and without the necessity of making any major changes to the stock vehicle windshield washing system.

One embodiment of the invention comprises a single, pre-assembled unit containing a washer blade assembly with an extended washer tube permanently attached to, and made an integral part of, the washer blade assembly.

This unit can be placed on vehicles at the point of manufacture or retro-fitted to existing vehicles by simply detaching the existing washer blade assembly and replacing it with the combination washer tube and blade invention

BRIEF SUMMARY OF THE INVENTION

It is an object of the present invention to provide a novel wiper assembly and associated regulated fluid conduit for sweeping a glass surface on a vehicle. More particularly, it is an object of the invention to provide a wiper assembly which includes a pivotally mounted wiper blade and an elongated washer liquid feed conduit, carried by the body of the wiper blade, that is connected to the fluid reservoir of the vehicle for supplying a regulated amount of washing liquid directly upon the glass surface of the vehicle via the wiper assembly Another object of the invention is to provide a combination of the aforementioned character in which the flow of fluid onto the glass surface of the vehicle is determined and regulated by the position of the wiper blade relative to the glass surface.

Another object of the invention is to provide a wiper assembly of the character described in the preceding paragraphs in which the washer liquid feed conduit and blade assembly can be interconnected with the supporting structure of the windshield wiper assembly without the need for specialty tools and without the need for any substantial modification to the conventional wiper assembly.

Another object of the invention is to provide a wiper assembly of the class described in which the washer liquid is uniformly sprayed directly down onto the surface to be cleaned immediately in advance of the wiper blade of the windshield wiper assembly so that the wiper blade can efficiently and effectively clean the glass surface as the wiper blade assembly sweeps over the vehicle windshield without the unsafe glare and vision impairment common with conventional windshield wiper systems.

Another object of the invention is to provide a wiper assembly as described in the preceding paragraph in which the washer liquid is carried by a single elongated conduit, carried by the body of the wiper blade, and is uniformly sprayed from the conduit directly down onto the surface to be cleaned immediately in advance of the wiper blade of the windshield wiper assembly.

Another object of the invention is to provide a wiper assembly as described in the preceding paragraphs in which the washer liquid is carried by a pair of side-by-side conduits and is uniformly sprayed from the 86 conduits directly down onto the surface to be cleaned immediately in advance of the wiper blade of the windshield wiper assembly.

Another object of the invention is to provide an apparatus of the character described in the preceding paragraphs in which the apparatus can be installed on vehicles at the point of manufacture, or alternatively can be retro-fitted to existing vehicles by simply detaching the existing washer blade assembly and replacing it with the combination washer tube and blade assembly of the invention.

Another object of the invention is to provide an apparatus of the character described in the preceding paragraphs which is reliable in operation and one which can be inexpensively manufactured in quantity.

BRIEF DESCRIPTION OF SEVERAL VIEWS OF THE DRAWINGS

FIG. 1 is a general perspective, bottom view of one form of the wiper blade apparatus of the present invention for sweeping a glass surface on a vehicle shown releasably affixed to a conventional windshield wiper assembly of the type that can be connected to the vehicle drive arm that drives the wiper assembly relative to the glass surface of the vehicle windshield.

FIG. 2 is an enlarged, cross-sectional view of the wiper blade apparatus shown in FIG. 1.

FIG. 3 is a top plan view of a conventional vehicle drive arm assembly to which the wiper assembly shown in FIG. 1 is connected.

FIG. 5 is a general perspective, bottom view of an alternate form of the wiper blade apparatus of the present invention for sweeping a glass surface on a vehicle shown releasably affixed to a conventional windshield wiper assembly of the type that can be connected to the vehicle drive arm that drives the wiper assembly relative to the glass surface of the vehicle windshield.

FIG. 6 is a greatly enlarged view of the area designated as "6" in FIG. 5.

FIG. 7 is an enlarged, cross-sectional view of the wiper blade apparatus shown in FIG. 5.

FIG. 8 is a general illustrative view illustrating the wiper blade apparatus illustrated in FIG. 7, disposed in three operative positions relative to the vehicle windshield.

FIG. 9 is a general perspective, bottom view of yet another form of the wiper blade apparatus of the present invention for sweeping a glass surface on a vehicle shown releasably affixed to a conventional windshield wiper assembly of the type that can be connected to the vehicle drive arm that drives the wiper assembly relative to the glass surface of the vehicle windshield.

FIG. 10 is an enlarged, cross-sectional view of the wiper blade apparatus shown in FIG. 9

FIG. 11 is a general illustrative view illustrating the wiper blade apparatus illustrated in FIG. 10, disposed in three operative positions relative to the vehicle windshield.

FIG. 12 is a general perspective, bottom view of still another form of the wiper blade apparatus of the present invention for sweeping a glass surface on a vehicle shown releasably affixed to a conventional windshield wiper assembly of the type that can be connected to the vehicle drive arm that drives the wiper assembly relative to the glass surface of the vehicle windshield.

FIG. 13 is a general illustrative, cross-sectional view illustrating the wiper blade apparatus illustrated in FIG. 12, disposed in three operative positions relative to the vehicle windshield.

FIG. 14 is a general perspective, bottom view of yet another form of the wiper blade apparatus of the present invention for sweeping a glass surface on a vehicle, shown releasably affixed to a conventional windshield wiper assembly of the type that can be connected to the vehicle drive arm.

FIG. 15 is a greatly enlarged, fragmentary view of the area designated as "15" in FIG. 14.

FIG. 16 is a general illustrative, cross-sectional view illustrating the wiper blade apparatus illustrated in FIG. 14, disposed in three operative positions relative to the vehicle windshield.

FIG. 17 is a greatly enlarged, fragmentary view of the area designated as "17" in FIG. 16.

FIG. 18 is a greatly enlarged, fragmentary view of the area designated as "18" in FIG. 16.

FIG. 19 is a general perspective, bottom view of yet another form of the wiper blade apparatus of the present invention for sweeping a glass surface on a vehicle shown affixed to a conventional windshield wiper assembly of the type that can be connected to the vehicle drive arm that drives the wiper assembly relative to the glass surface of the vehicle windshield.

FIG. 20 is a greatly enlarged view of the area designated as "20" in FIG. 19.

FIG. 21 is a general illustrative view illustrating the wiper blade apparatus illustrated in FIG. 19, disposed in three operative positions relative to the vehicle windshield.

DETAILED DESCRIPTION OF THE INVENTION

Figure 4:
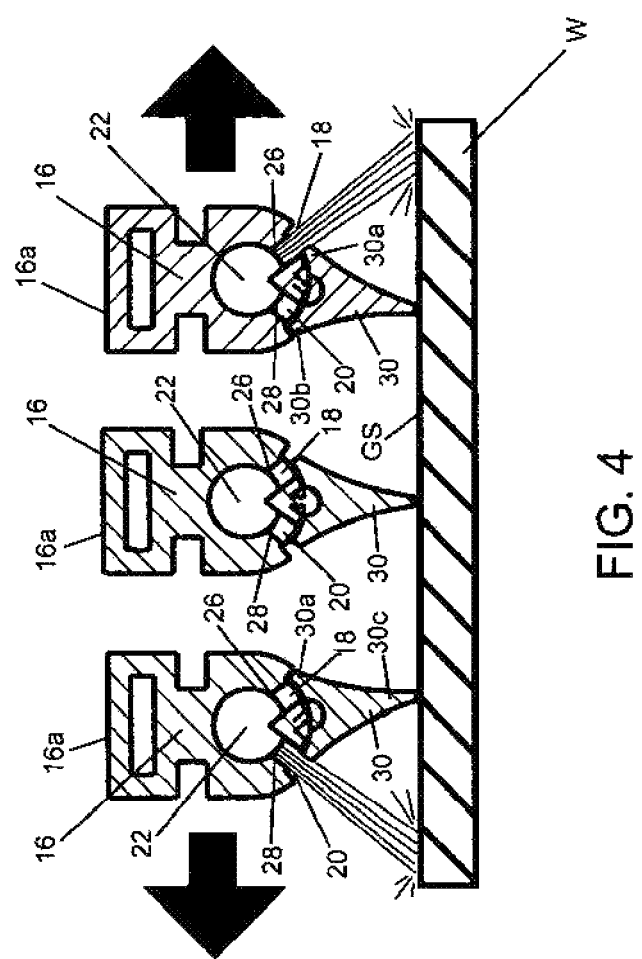
FIG. 4 is a generally illustrative view illustrating the wiper blade apparatus illustrated in FIG. 2 disposed in three operative positions relative to the vehicle windshield.

Referring to the drawings and particularly to FIGS. 1 through 4, one form of washing apparatus for washing a glass surface on a vehicle windshield is there shown. The novel feature of the present invention comprises a wiper blade assembly generally designated by the numeral 14. As depicted in FIG. 1, wiper blade assembly 14 can be affixed to, or alternatively readily removably connected to a conventional structural support "S" having first and second extremities "S-1" and "S-2". Structural support "S" includes transversely spaced-apart side walls "SW-1" and "SW-2" which, as shown in FIG. 3, are used to pivotally interconnect the structural support with the vehicle drive arm "DA" that drives the structural support relative to the vehicle windshield. Structural support "S" also includes a plurality of spaced-apart connector brackets "CB" to which the wiper blade assembly 14 is connected in the manner shown in FIG. 1.

Referring particularly to FIG. 3 of the drawings, wiper blade assembly 14 can be seen to comprise a body portion 16 having first and second rows of longitudinally spaced apart, angularly downwardly extending fluid outlet passageways 18 and 20 that are in communication with an elongated fluid conduit 22 that is carried by the body portion 16. Fluid conduit 22 has a first end 22a that is in communication with the pump "P" of the vehicle via a conventional valve "V" and a connector tube 24 (see FIG. 1) and a second crimped end 22b. As depicted in FIG. 1, pump "P" is in communication with a vehicle reservoir "VR" via a connector tube "C". Elongated fluid conduit 22 has first and second rows of circumferentially spaced fluid outlets 26 and 28 that are in communication respectively with the rows of fluid outlet passageways 18 and 20 of body portion 16.

An elongated wiper blade 30 is pivotally connected to body portion 16 for movement between a first position shown in the left hand portion of FIG. 4 blocking fluid flow first fluid passageways 18 and permitting fluid flow from second fluid passageways 20 and a second position shown in the right hand portion of FIG. 4 blocking fluid flow from second fluid passageways 20 and permitting fluid flow from first fluid passageways 18. When elongated wiper blade 30 is in the position shown in the center portion of FIG. 4 the wiper blade effectively blocks fluid flow from both the first and second fluid passageways.

As best seen in FIG. 2, wiper blade 30 is generally triangular in cross-section and has first and second yieldably deformable side edges 30a and 30b and a yieldably deformable lower extremity 30c that is maintained in engagement with the glass surface "GS" of the vehicle windshield "W". When wiper blade 30 is in the position shown in the left hand portion of FIG. 4, edge 30a is in sealable engagement with body 16 at a location proximate passageway 18. Similarly, when wiper blade 30 is in the position shown in the right hand portion of FIG. 4, edge 30b is in sealable engagement with the body 16 at a location proximate passageway 20.

To enable easy interconnection of body 16 with the connector brackets "CB" of structural support "S", body 16 is provided with an elongated, generally rectangular shaped upper connector portion 16a.

In the form of the invention illustrated in FIGS. 1 through 4, wiper blade assembly 14 further includes a connector member 34 that functions to interconnect wiper blade 30 with body 16 of the wiper blade assembly. Connector member 34, which functions to simplify the molding process, here comprises an upper portion 34a that is generally triangular in cross-section and a lower portion 34b that is generally hemispherical in cross-section. In the manner shown in FIG. 2, upper portion 34a is here connected to body 16, while lower portion 34b is connected to wiper blade 30.

In using the apparatus of this first form of the invention, energizing of the windshield wiper motor and of the pump "P" by the vehicle operator will cause the wiper arm to sweep over the windshield and at the same time will cause washer fluid to controllably flow into the feed conduit 22 via a conventional check valve "V". As the wiper blade starts the "up sweep" motion, blade 30 will pivot in the manner shown in the left hand portion of FIG. 4, opening passageways 20 and sealing passageways 18. Because of the strategic location of outlets 28 and passageways 20, the washer fluid will flow uniformly onto the surface to be cleaned in advance of the travel of the wiper blade 30 in a manner such that the wiper blade can efficiently clean the glass surface during the upward sweep.

Similarly, as the wiper blade starts the "down sweep" motion, blade 30 will pivot in the manner shown in the right hand portion of FIG. 4, opening passageways 18 and sealing passageways 20. Because of the strategic location of outlets 26 and passageways 18, the washer fluid will flow uniformly onto the surface to be cleaned in advance of the travel of the wiper blade 30 in a manner such that the wiper blade can efficiently clean the glass surface during the downward sweep.

Turning now to FIGS. 5 through 8, an alternate form of washing apparatus of the invention for washing a glass surface on a vehicle windshield is there shown. This alternate form of washing apparatus is similar in many respects to the earlier described embodiment and like numerals are used in FIGS. 5 through 8 to identify like components. The major difference between this apparatus and that previously described resides in the provision of a wiper blade assembly 38 of a slightly different construction.

Wiper blade assembly 38 here comprise a body portion 40 having a single row of longitudinally spaced part, generally vertically downwardly extending fluid outlet passageways 42 that are in communication with an elongated fluid conduit 44 that is carried by body 40 (FIGS. 5 and 7). As depicted in FIG. 5, wiper blade assembly 38 can be readily removably connected to a conventional structural support "S" having first and second extremities "S-1" and "S-2". Structural support "S", which is substantially identical in construction and operation to that previously described, includes transversely spaced-apart side walls "SW-1" and "SW-2" which, as before, are used to pivotally interconnect the structural support with the vehicle drive arm "DA" that drives the structural support relative to the vehicle windshield (see FIG. 3).

Referring particularly to FIG. 7 of the drawings, fluid conduit 44 has a first end 44a that is in communication with the pump "P" of the vehicle via a conventional valve "V" and a connector tube 24 and a second crimped end 44b. As before, pump "P" is in communication with a vehicle reservoir "VR" via a connector tube "C". Elongated fluid conduit 44 has a row of longitudinally spaced fluid outlet passageways 46 that are in communication with passageways 42 of body portion 40.

An elongated wiper blade 50 is pivotally connected to body portion 40 for movement between a first position shown in the left hand portion of FIG. 8 permitting fluid flow from fluid passageways 46 onto the windshield in advance of the upward sweep of the wiper blade (see arrow 51) and a second position shown in the right hand portion of FIG. 8 permitting fluid flow from fluid passageways 46 onto the windshield in advance of the downward sweep of the wiper blade (see arrow 53).

As best seen in FIG. 7, wiper blade 50 is generally triangular in cross-section and has first and second apertured side edges 50a and 50b and a yieldably deformable lower extremity 50c that is maintained in engagement with the glass surface "GS" of the vehicle windshield "W". When wiper blade 50 is in the position shown in the left hand portion of FIG. 8, fluid can flow from passageway 42 past the edge of the blade via fluid flow aperture 50a Similarly, when wiper blade 50 is in the position shown in the right hand portion of FIG. 8, fluid can flow from passageway 42 past the edge of the blade via fluid flow aperture 50b. When wiper blade 50 is in the position shown in the central portion of FIG. 8, blade 50 resides beneath passageway 42.

As before, to enable easy interconnection of body 40 with the connector brackets "CB" of structural support "S", body 40 is provided with an elongated, generally rectangular shaped upper connector portion 40a.

In the form of the invention illustrated in FIGS. 5 through 8, wiper blade 50 is connected to body 40 by means of a yieldably deformable connector element 56.

In using the apparatus of this latest form of the invention, energizing of the windshield wiper motor and of the pump "P" by the vehicle operator will cause the wiper arm to sweep over the windshield and at the same time will cause washer fluid to controllably flow into the feed conduit 44 via a conventional check valve "V". As the wiper blade starts the "up sweep" motion in the direction of arrow 51, blade 50 will pivot in the manner shown in the left hand portion of FIG. 8. Because of the strategic location of outlets 46 and passageways 42, the washer fluid will flow uniformly past the edge of the wiper blade and onto the surface to be cleaned in advance of the travel of the wiper blade 50 in a manner such that the wiper blade can efficiently clean the glass surface during the upward sweep.

Similarly, as the wiper blade starts the "down sweep" motion in the direction of the arrow 53, blade 50 will pivot in the manner shown in the right hand portion of FIG. 8 permitting the washer fluid to flow uniformly past the edge of the wiper blade and onto the surface to be cleaned in advance of the travel of the wiper blade 50 in a manner such that the wiper blade can efficiently clean the glass surface during the downward sweep.

Referring next to FIGS. 12 and 13, yet another form of windshield washing apparatus of the invention for washing a glass surface on a vehicle windshield is there shown. This latest form of washing apparatus is similar in some respects to the earlier described embodiments and like numerals are used in FIGS. 12 and 13 to identify like components. The major difference between this latest apparatus and those previously described resides in the provision of a wiper blade assembly 74 of still another novel construction.

Wiper blade assembly 74 here comprises a body portion 76 that houses an elongated fluid conduit 78 that is provided with two spaced apart rows of longitudinally spaced apart, angularly downwardly extending fluid outlet passageways 80 and 82 (Central portion of FIG. 13).

As before and as depicted in FIG. 12, wiper blade assembly 74 can be readily removably connected to a conventional structural support "S" having first and second extremities "S-1" and "S-2". Structural support "S", which is substantially identical in construction and operation to that previously described, includes transversely spaced-apart side walls "SW-1" and "SW-2" which, as before, are used to pivotally interconnect the structural support with the vehicle drive arm "DA" that drives the structural support relative to the vehicle windshield (see FIG. 3).

Referring particularly to FIG. 12 of the drawings, the first end 78a of fluid conduit 78 is in communication with the pump "P" of the vehicle via a conventional valve "V" and a connector tube 83. As before, pump "P" is in communication with a vehicle reservoir "VR" via a connector tube "C".

As best seen in FIG. 13, for a purpose presently to be described, a pair of spaced apart, yieldably deformable first and second blocking tabs 86 and 88 are connected to and extend downwardly from body portion 76. Also connected to body portion 76 is an elongated wiper blade 90 that is pivotally connected to body portion 76 for movement between a first position shown in the left hand portion of FIG. 13 to a second position shown in the right hand portion of FIG. 13. When the wiper blade 90 is in the first position shown in the left hand portion of FIG. 13 fluid is free to flow from fluid passageway 80 onto the windshield in advance of the upward sweep of the wiper blade (see arrow 91). However, in this position, blade 90 has urged blocking tab 88 into blocking engagement with fluid passageway 82 thereby blocking fluid flow through this passageway. When the wiper blade 90 is in the second position shown in the right hand portion of FIG. 13 fluid is free to flow from fluid passageway 82 in advance of the downward sweep of the wiper blade (see arrow 93). However, in this position, blade 90 has urged blocking tab 86 into blocking engagement with fluid passageway 80 thereby blocking fluid flow through this passageway onto the windshield in advance of the upward sweep of the wiper blade and a second position shown in the right hand portion of FIG. 13 permitting fluid flow from fluid passageways 82 of conduit 76 onto the windshield in advance of the downward sweep of the wiper blade.

As before, wiper blade 90 is generally triangular in cross-section and has a yieldably deformable lower extremity 90a that is maintained in engagement with the glass surface "GS" of the vehicle windshield "W". As in the earlier described embodiments, to enable easy interconnection of body 76 with the connector brackets "CB" of structural support "S", body 76 is provided with an elongated, generally rectangular shaped upper connector portion 76a.

In using the apparatus of this latest form of the invention, energizing of the windshield wiper motor and of the pump "P" by the vehicle operator will cause the wiper arm to sweep over the windshield and at the same time will cause washer fluid to controllably flow into the feed conduit 76 via a conventional check valve "V". As the wiper blade starts the "up sweep" motion in the direction of arrow 91, blade 90 will pivot in the manner shown in the left hand portion of FIG. 13.

Because of the strategic location of the outlets 80 and 82, the washer fluid will flow uniformly past the edge of the wiper blade and onto the surface to be cleaned in advance of the travel of the wiper blade in a manner such that the wiper blade can efficiently clean the glass surface during the upward sweep.

Similarly, as the wiper blade starts the "down sweep" motion, blade 90 will pivot in the manner shown in the right hand portion of FIG. 13 permitting the washer fluid to flow uniformly past the edge of the wiper blade and onto the surface to be cleaned in advance of the travel of the wiper blade 90 in a manner such that the wiper blade can efficiently clean the glass surface during the downward sweep.

Referring next to FIGS. 14 through 18, still another form of windshield washing apparatus of the invention for washing a glass surface on a vehicle windshield is there shown. This fourth form of washing apparatus is similar in some respects to the earlier described embodiments and like numerals are used in FIGS. 14 through 18 to identify like components. The major difference between this latest apparatus and those previously described resides in the provision of a wiper blade assembly 94 of still another novel construction.

Wiper blade assembly 94 here comprises a body portion 96 that houses an elongated fluid conduit 98 that is provided with two spaced apart rows of longitudinally spaced apart, angularly downwardly extending fluid outlet passageways 100 and 102 (central portion of FIG. 16). As best seen by referring to FIG. 15, these fluid outlet passageways in this latest form of the invention are generally rectangular in shape.

As before and as depicted in FIG. 14, wiper blade assembly 94 can be readily removably connected to a conventional structural support "S" having first and second extremities "S-1" and "S-2". Structural support "S", which is substantially identical in construction and operation to that previously described, includes transversely spaced-apart side walls "SW-1" and "SW-2" which, as before, are used to pivotally interconnect the structural support with the vehicle drive arm "DA" that drives the structural support relative to the vehicle windshield (see FIG. 3).

Referring particularly to FIG. 14 of the drawings, the first end 98a of fluid conduit 98 is in communication with the pump "P" of the vehicle via a conventional valve "V" and a connector tube 103. As before, pump "P" is in communication with a vehicle reservoir "VR" via a connector tube "C".

As best seen in FIG. 16, in this latest form of the invention the pair of spaced apart, yieldably deformable first and second blocking tabs found in the previously described embodiment are absent. In this latest embodiment, the elongated wiper blade 104 is pivotally connected to body portion 96 by means of a flexible connector element 106 and is movable between a first position shown in the left hand portion of FIG. 16 to a second position shown in the right hand portion of FIG. 16. When the wiper blade 104 is in the first position shown in the left hand portion of FIG. 16, fluid is free to flow from fluid passageway 100 onto the windshield in advance of the upward sweep of the wiper blade (see arrow 107). However, in this position, the shoulder 104c of blade 104 has moved into blocking engagement with fluid passageway 102 thereby blocking fluid flow through this passageway. When the wiper blade 104 is in the second position shown in the right hand portion of FIG. 16, fluid is free to flow from fluid passageway 102 in advance of the downward sweep of the wiper blade (see arrow 109). However, in this position, shoulder 104b of blade 104 has moved into blocking engagement with fluid passageway 100 thereby blocking fluid flow through this passageway onto the windshield.

As before, wiper blade 104 is generally triangular in cross-section and has a yieldably deformable lower extremity 104a that is maintained in engagement with the glass surface "GS" of the vehicle windshield "W". As in the earlier described embodiments, to enable easy interconnection of body 96 with the connector brackets "CB" of structural support "S", body 96 is provided with an elongated, generally rectangular shaped upper connector portion 96a.

In using the apparatus of this latest form of the invention, energizing of the windshield wiper motor and of the pump "P" by the vehicle operator will cause the wiper arm to sweep over the windshield and at the same time will cause washer fluid to controllably flow into the feed conduits 100 and 102 via a conventional check valve "V". As the wiper blade starts the "up sweep" motion, blade 104 will pivot in the manner shown in the left hand portion of FIG. 16.

Because of the strategic location of outlets 100, the washer fluid will flow uniformly past the edge of the wiper blade and onto the surface to be cleaned in advance of the travel of the wiper blade 104 in a manner such that the wiper blade can efficiently clean the glass surface during the upward sweep.

Similarly, as the wiper blade starts the "down sweep" motion, blade 104 will pivot in the manner shown in the right hand portion of FIG. 16, permitting the washer fluid to flow uniformly past the edge of the wiper blade and onto the surface to be cleaned in advance of the travel of the wiper blade 90 in a manner such that the wiper blade can efficiently clean the glass surface during the downward sweep.

Turning now to FIGS. 19 through 21, still another alternate form of washing apparatus of the invention for washing a glass surface on a vehicle windshield is there shown. This alternate form of washing apparatus is similar in many respects to the embodiment shown in FIGS. 5 through 8. The major difference between this apparatus and that previously described resides in the provision of a wiper blade assembly 112 of a slightly different construction.

Wiper blade assembly 112 here comprise a body portion 114 having a single row of longitudinally spaced part, generally vertically downwardly extending fluid outlet passageways 116 that are in communication with an elongated fluid conduit 118 that is carried by body portion 114 (FIG. 21). As depicted in FIG. 19, wiper blade assembly 112 can be readily connected to a conventional structural support that is substantially identical in construction and operation to that previously described, and includes transversely spaced-apart side walls which, as before, are used to pivotally interconnect the structural support with the vehicle drive arm that drives the structural support relative to the vehicle windshield (see FIG. 3).

Referring particularly to FIG. 19 of the drawings, fluid conduit 118 has a first end 118a that is in communication with the pump "P" of the vehicle via a conventional valve "V" and a connector tube 120 and a second crimped end 118b. As before, pump "P" is in communication with a vehicle reservoir "VR" via a connector tube "C". Elongated fluid conduit 118 has a row of longitudinally spaced fluid outlet passageways that are in communication with passageways 116 of body portion 114.

An elongated wiper blade 122 is pivotally connected to body portion 114 for movement between a first position shown in the left hand portion of FIG. 21 permitting fluid flow from fluid passageways 116 onto a first shoulder 124a of wiper blade 122 and then onto the windshield in advance of the upward sweep of the wiper blade (see arrow 125) and a second position shown in the right hand portion of FIG. 21 permitting fluid flow from fluid passageways 116 onto a second shoulder 124b of wiper blade 122 and then onto the windshield in advance of the downward sweep of the wiper blade (see arrow 127).

As best seen in FIG. 21, wiper blade 122 is generally triangular in cross-section and has a yieldably deformable lower extremity 126 that is maintained in engagement with the glass surface "GS" of the vehicle. Unlike the wiper blade of the embodiment of FIGS. 5 through 8 that has first and second apertured side edges 50a and 50b, wiper blade 122 is provided with uniquely configured first and second shoulders 124a and 124b. When wiper blade 122 is in the position shown in the left hand portion of FIG. 21, fluid can flow from passageway 116 onto shoulder 124a and onto the windshield. Similarly, when wiper blade 122 is in the position shown in the right hand portion of FIG. 21, fluid can flow from passageway 116 onto shoulder 124b and onto the windshield. When wiper blade 122 is in the position shown in the central portion of FIG. 21, blade 122 resides beneath passageway 116.

As before, to enable easy interconnection of body 114 with the connector brackets "CB" of structural support, body 114 is provided with an elongated, generally rectangular-shaped upper connector portion 114a.

In using the apparatus of this latest form of the invention, energizing of the windshield wiper motor and of the pump "P" by the vehicle operator will cause the wiper arm to sweep over the windshield and at the same time will cause washer fluid to controllably flow into the feed conduit 118 via a conventional check valve "V". As the wiper blade starts the "up sweep" motion in the direction of arrow 125, blade 122 will pivot in the manner shown in the left hand portion of FIG. 21. Because of the strategic location of outlets 116 and passageways 118, the washer fluid will flow uniformly past the shoulder of the wiper blade and onto the surface to be cleaned in advance of the travel of the wiper blade 122 in a manner such that the wiper blade can efficiently clean the glass surface during the upward sweep.

Similarly, as the wiper blade starts the "down sweep" motion in the direction of the arrow 127, blade 122 will pivot in the manner shown in the right hand portion of FIG. 21, permitting the washer fluid to flow uniformly past the shoulder of the wiper blade and onto the surface to be cleaned in advance of the travel of the wiper blade 122 in a manner such that the wiper blade can efficiently clean the glass surface during the downward sweep.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

The invention claimed is:

1. A washing apparatus for washing a glass surface on a vehicle having a fluid reservoir, a pump connected to the fluid reservoir for pumping fluid from the fluid reservoir, a windshield wiper drive arm movable upwardly and downwardly relative to the glass surface and a structural support connected to the windshield wiper drive arm, said washing apparatus comprising a wiper blade assembly connected to the structural support, said wiper blade assembly comprising:
   (a) a body;
   (b) a fluid conduit carried by said body, said fluid conduit being in communication with the pump of the vehicle and having a plurality of fluid outlet passageways;
   (c) a wiper blade pivotally connected to said body for movement relative to said fluid outlet passageways between first and second positions;
   (d) said wiper blade having at least first and second shoulders;
   (e) wherein each of said first and second shoulders is provided with fluid flow apertures; and
   (f) wherein at least one of said fluid flow apertures enable fluid to pass therethrough.

2. A washing apparatus for washing a glass surface on a vehicle having a fluid reservoir, a pump connected to the fluid reservoir for pumping fluid from the fluid reservoir, a windshield wiper drive arm movable upwardly and downwardly relative to the glass surface and a structural support connected to the windshield wiper drive arm, said washing apparatus comprising a wiper blade assembly connected to the structural support, said wiper blade assembly comprising:
   (a) a body having a plurality of longitudinally spaced fluid outlet passageways in communication with the pump of the vehicle;
   (b) a connector member connected to and extending from said body of said wiper blade assembly for movement between a first position and a second position;
   (c) a wiper blade connected to said connector member and being movable therewith, said wiper blade being generally triangular in cross-section and having a yieldably deformable lower extremity that is maintained in engagement with the glass surface and first and second shoulders movable into engagement with said body; and
   (d) wherein each of said first and second shoulders is provided with fluid flow apertures.

3. The apparatus of claim 2 wherein said fluid flow apertures comprise scalloped areas of said shoulders.

4. The apparatus of claim 2 wherein said fluid flow apertures comprise flat locations on said shoulders.

5. The apparatus of claim 2 wherein said fluid flow apertures cause the flow of fluid from any of said fluid outlet passageways to be unobstructed by said at least one shoulder.

6. The apparatus of claim 2 wherein said fluid outlet passageways are centrally spaced along said connector member.

7. An apparatus for washing a surface, comprising;
   (a) a wiper attachable to a drive arm movable reciprocally along a path of travel;
   (b) said wiper having at least one central member through which fluid can flow;
   (c) said at least one central member having at least one fluid inlet, and at least one fluid outlet spaced longitudinally along said wiper;
   (d) said wiper having a blade in movable contact with the surface to be washed;
   (e) said blade having a deformable connection with said at least one central member;
   (f) said deformable connection yieldable in response to said reciprocating motion, whereby said blade is movable into engagement with any of said fluid outlets;

(g) whereby said movable engagement allows the flow of fluid from any of said fluid outlets;
(h) wherein said blade has at least one shoulder;
(i) wherein said at least one shoulder has at least one fluid aperture; and
(j) wherein at least one of said fluid flow apertures enable fluid to pass therethrough.

8. The apparatus of claim 7 wherein said fluid flow apertures comprise scalloped areas of said shoulders.

9. The apparatus of claim 7 wherein said fluid flow apertures comprise flat locations on said shoulders.

10. The apparatus of claim 7 wherein said fluid flow apertures cause the flow of fluid from any of said fluid outlets to be unobstructed by said at least one shoulder.

11. The apparatus of claim 7 wherein said fluid outlets are centrally spaced along said deformable connection.

12. The apparatus of claim 7, wherein said movable engagement enabling the flow of fluid from any of said fluid outlets results in the fluid being deposited only in advance of the direction of travel of the drive arm in its reciprocating path of travel.

13. A process for washing a surface, comprising the steps of:
(a) moving a wiper reciprocally along a path of travel, wherein said wiper has at least one central member;
(b) forcing fluid through at least one central member of said wiper;
(c) providing at least one fluid outlet spaced longitudinally along said at least one central member;
(d) providing a blade in movable contact with the surface to be washed, said blade having a deformable connection with said at least one central member;
(e) Reciprocally moving said washer whereby said deformable connection is yieldable in response to said reciprocating motion and results in movable engagement of the blade with any of said fluid outlets;
(f) allowing the flow from any of said fluid outlets with said movable engagement;
(g) sweeping the fluid from the surface to be washed with said blade as the wiper travels in its reciprocating path of travel;
(h) providing said blade with at least one shoulder;
(i) providing said at least one shoulder with at least one fluid aperture;
(j) wherein at least one of said fluid flow apertures enable fluid to pass therethrough.

14. The process of claim 13 wherein said fluid flow apertures comprise scalloped areas of said shoulders.

15. The process of claim 13 wherein said fluid flow apertures cause the flow of fluid from any of said fluid outlets to be unobstructed by said at least one shoulder.

16. The process of claim 13 wherein said fluid outlets are centrally spaced along said deformable connection.

17. The process of claim 13, wherein said movable engagement enabling the flow of fluid from any of said fluid outlets results in the fluid being deposited only in advance of the direction of travel of the drive arm in its reciprocating path of travel.

* * * * *